United States Patent
Engwer et al.

[11] Patent Number: 5,987,062
[45] Date of Patent: *Nov. 16, 1999

[54] SEAMLESS ROAMING FOR WIRELESS LOCAL AREA NETWORKS

[75] Inventors: Darwin A. Engwer, San Jose; Ken Clements, Los Gatos; Jonathan M. Zweig, Mountain View; Daniel S. Perrin, San Jose, all of Calif.

[73] Assignee: Netwave Technologies, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/573,272

[22] Filed: Dec. 15, 1995

[51] Int. Cl.$^6$ .............................. H04B 3/46; H04B 17/00
[52] U.S. Cl. ...................... 375/225; 375/227; 455/434; 455/437; 455/67.4; 370/251
[58] Field of Search .................................. 375/225, 260, 375/267, 347, 224, 227; 455/421, 432, 434, 436, 437, 438, 443, 67.4; 370/248, 249, 250, 251, 252, 253

[56] References Cited

U.S. PATENT DOCUMENTS

| | | | |
|---|---|---|---|
| 4,829,519 | 5/1989 | Scotton et al. | 455/443 |
| 5,054,035 | 10/1991 | Tarallo et al. | 375/225 |
| 5,249,290 | 9/1993 | Heizer | 395/650 |
| 5,483,676 | 1/1996 | Mahany et al. | 370/346 |
| 5,548,821 | 8/1996 | Coveley | 455/67.4 |
| 5,634,204 | 5/1997 | Takahashi et al. | 455/134 |
| 5,751,766 | 5/1998 | Kletsky et al. | 375/225 |

*Primary Examiner*—Don N. Vo
*Attorney, Agent, or Firm*—Skjerven, Morrill, MacPherson, Franklin & Friel, LLP; Tom Chen

[57] ABSTRACT

A wireless local area network allows roaming of a mobile unit to allow it to serially associate with a number of access points of the network fixed backbone. This roaming is supported by an improved measurement of communications link quality, which includes calculating a mean error free length of a test pattern broadcast by each access point and received by a mobile unit. The test pattern is a digital data message. Thus an accurate measurement of link quality is provided which allows a mobile unit to determine whether it should change its association to another access point having improved communications link quality. Further, a load balancing process is provided to balance the communications load amongst a variety of access points, by allowing mobile units also to switch their association with access points in accordance with a current total data rate at any given access point and also considering the number of currently high data rate mobile units associated with a particular access point at any one time.

59 Claims, 3 Drawing Sheets

Microfiche Appendix Included
(1 Microfiche, 59 Pages)

SEAMLESS ROAMING FOR WIRELESS LOCAL AREA NETWORKS

MICROFICHE APPENDIX

The Microfiche Appendix having 1 fiche and 59 total frames which is a part of the present disclosure is a listing of software executed in accordance with one embodiment of the present invention. A portion of the disclosure of this patent document contains material subject to copyright protection. The copyright owner has no objection to the facsimile reproduction by anyone of the patent documents or patent disclosure, as it appears in the Patent and Trademark Office patent files or records, but otherwise reserves all copyright rights whatsoever.

BACKGROUND OF THE INVENTION

1. Field of the Invention

This invention relates to local area networks and particularly to a wireless local area network having distributed control and supporting roaming of mobile units in terms of their contact with network access points.

2. Description Of The Prior Art

Xircom, Inc. has developed wireless local area network computer communication devices designated "Netwave" and described in published patent document PCT/US94/07004 entitled "Virtual Carrier Detection for Wireless . . . " inventors Kenneth J. Biba et al., published Jan. 5, 1995, incorporated herein by reference. The Netwave technology uses 2.4 GHz ISM band frequency hopping radio data transmissions. This technology allows users to form computer networks of mobile computers without the need to have these mobile computers connected by wires.

Although the Xircom Netwave product is a local area network, it achieves maximum potential when used in the form of multiple connected network service areas that provide coverage throughout a user's facility (e.g. an office building or group of buildings). This is analogous to a cellular radio telephone system in which a total coverage area is divided up into cells that have intelligent relay stations. The term "roaming" comes from cellular telephony and, in that context, describes the process by which a mobile telephone user moves from cell to cell while maintaining the virtual telephone line connection. In the case of the Netwave product, roaming provides the same benefit to the user; however, because the Netwave product supports a packet data network, the underlying roaming process differs.

To provide extended coverage of an area, Netwave uses a dedicated station called an Access Point (AP). An AP is usually connected to some form of fixed "backbone" network (i.e. wired, fiber or point-to-point radio) and it is a relay station that receives radio data packets off the air and transmits them on the fixed backbone and vice versa. FIG. 1 shows a system with four Access Points 10, 12, 14, 16 connected to a wired backbone network 20 that includes resources 24 such as printers and file servers.

Each AP 10, 12, 14, 16 is surrounded by a boundary indicating the edge of the region covered by its radio transceiver. This region is called herein the Basic Service Area (BSA). When APs are linked on backbone network 20, these BSAs can be joined to form an Extended Service Area (ESA). Roaming enables the Netwave user, by using a Mobile Unit (MU) (not shown), to treat the ESA as if it were only one BSA.

The above-referenced patent disclosure describes in detail a method and apparatus for roaming, beginning at page 48. However, it has been found that an improvement is possible over the roaming technique described therein. There is needed a more reliable method for establishing, by a well defined process, with which AP a particular mobile unit should be associated at any given time and when and under what conditions the mobile unit should change its associated AP.

Other wireless local area networks faced with the roaming problem typically use as a measure of goodness of connection quality between a particular mobile unit and an access point, the RSSI (received signal strength indicator) measurement, which is an RF measurement of carrier strength only. For instance, in cellular telephony a cellular site monitors the RSSI of a particular cellular telephone and in conjunction with other cellular sites triangulates to determine the location of that particular cellular telephone, so as to determine with which site that cellular telephone should be linked. Other wireless local area networks use RSSI measurement in the mobile unit to determine which is the closest access point.

It has been found by the present inventors that the RSSI technique, whether carried out by the access point or the mobile unit, is inadequate because it only measures the radio signal strength and does not adequately measure optimum communications quality.

Thus for effective roaming in a local area network, a better approach to roaming and determining the optimum association between a mobile unit and access points is needed.

SUMMARY

In accordance with the present invention, for roaming, each access point periodically broadcasts a known test pattern of data. This broadcast process easily scales to a larger system while reducing the available time for information-bearing transmissions by only a constant amount. Each mobile unit within range receives this test pattern and compares it to an identical test pattern previously stored in the mobile unit. This test pattern comparison thereby provides an actual measurement of the quality of the communications link, rather than using a proxy such as received carrier signal strength. This is especially advantageous in the context of a digital data packet radio communication system. Each mobile unit gauges upon receipt of each test pattern the quality of the link to the access point which transmitted the test pattern. At any one time a mobile unit may receive test patterns from a variety of access points and then change its association from a first access point to a second access point in order to improve the quality of the communications link. Hence the present approach to roaming is seamless because even if a mobile unit moves, it maintains good quality communication with the backbone network.

To put this another way, the present invention is directed to communicating between a unit (not necessarily mobile) and a base using a plurality of communication channels. The communication channels are the links between individual units and the base (the backbone network). A message which includes data which is known to the unit is transmitted from a first access point (a first communications channel) to the unit and the unit evaluates a quality of the communications by measuring how much of the known data is received at the unit. If the quality falls below a threshold, the unit switches to a second channel (associates with the second access point) for subsequent communications between the unit and the base.

Thus it can be seen that the present method and apparatus are not limited to a wireless local area network but also apply to other communications situations where multiple channels are available and the communications unit must select one channel from those available in order to optimize the communications quality. Thus in accordance with the invention a transmitted test pattern is used to measure link quality where a number of different alternate channels are available.

In accordance with one embodiment of the present invention, the quality of the communications link is determined by the mean error free length of the data received at the mobile unit; a digital multi-stage adaptive filter is applied to the error free length of the test patterns received by each mobile unit. The test patterns are typically shorter than an actual digital data packet, but the content is structured and the mode of transmission is set to provide maximum stress on the link, i.e. optimize the test of link quality. In other embodiments, other data is combined with the mean error free length in order to measure communications quality. For instance, the total communications load on a particular access point in terms of its usage rate is measured and used to balance the load among various access points. This usage level includes an overall usage level as well as a measurement of the number of high usage mobile units associated with a particular access point.

The mobile units in accordance with the present invention are typically (but not limited to) computing devices such as a personal digital assistant, palm top computer, a notebook computer, or a desktop computer, each including a two way radio data communications facility.

Moreover, the mobile units and access points in accordance with the present invention in terms of hardware and software may be identical to those described in the above-referenced patent disclosure, except for the modifications described herein for improved roaming. Hence these other features are not described in detail herein. Moreover, the present roaming improvements are not limited to that system but are generally applicable to wireless local area networks and other multi-channel communication environments, as will be understood by one of ordinary skill in the art in light of this disclosure.

DETAILED DESCRIPTION

Figure 1:
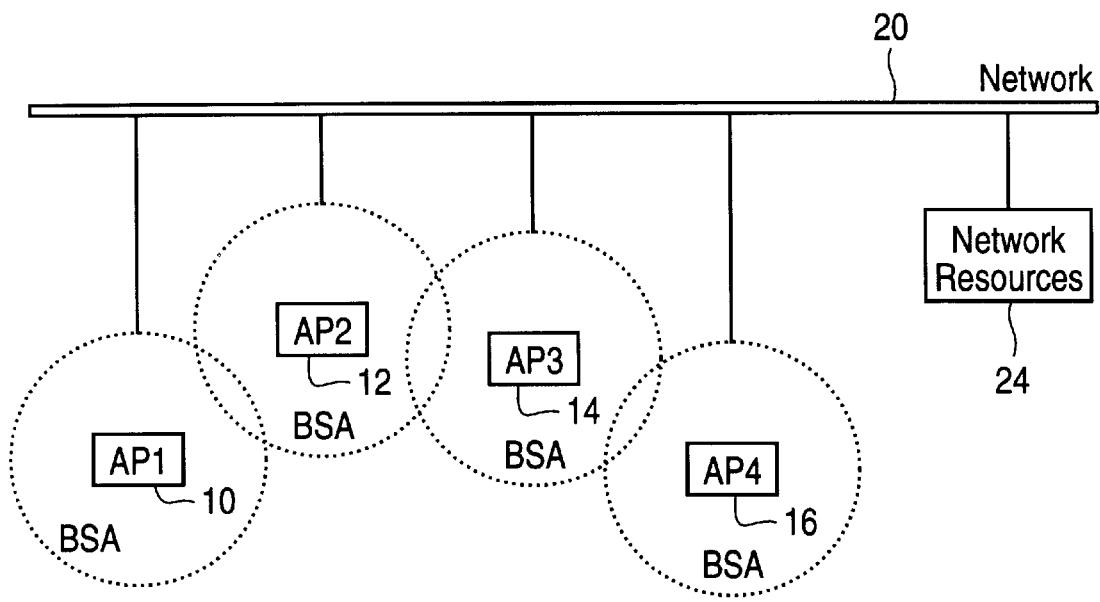
FIG. 1 shows diagrammatically the technical problem of roaming.

The approach to roaming in accordance with the present invention assigns as much of the work as possible to the mobile unit (MU). This provides scaleability through distributed processing. The MU uses the received broadcast data to decide which access point (AP) is the best at a given time for communications. This data is in the form of special packets that are broadcast by each of the APs.

An example (not limiting) of a roaming mobile unit is a notebook-type computer with a suitable adapter card of the type disclosed in the above-referenced patent disclosure installed in its PCMCIA slot. The adapter card includes the radio transmitter/receiver as well as suitable hardware (including a microcontroller) and resident software to support wireless communications. A similar adapter card is installed in each access point. Of course, this is only an example; alternatively the circuitry and software on the adapter card is built-in to the mobile unit or access point. Thus the term "mobile unit" used herein refers alternatively to such an adapter card, to equivalent functionality embedded in a computing device, or to the combination of such an adapter card installed in a computing device.

Each AP changes its radio channel (frequency) e.g. 10 times a second for both transmitting and receiving; this time period is called a "hop." To communicate with any given AP, an MU must know that the AP exists, on which channel the AP is operating, as well as when and on which channel it will operate next. To make this possible, each AP transmits special broadcast messages called herein "Short Beacons," which occur many times a second if the AP has no other traffic to relay. If the AP is busy, the Short Beacons are transmitted at a lower rate.

When a MU is first put into active service, it first listens to as many radio channels as possible to try to receive transmissions (Short and Long Beacons) from various APs. This process is called "scanning". Codes in the Short Beacon packets identify the APs heard as belonging to the ESA, and the MU keeps a list of APs that have been encountered, along with their synchronization (frequency hop) information. At the start of each new hop, each AP transmits a special broadcast message called herein a "Long Beacon." This Long Beacon supports roaming because it includes a communication test pattern. The test pattern is always the same for all APs, and thus provides a known data transmission test. Each MU compares each received Long Beacon to the standard stored in the MU to determine how many bits of the pattern were received before a bit error occurred (the error free length or EFL). Only the bits before the first error are counted, because once an error occurs loss of bit synchronization makes the rest of the test pattern unreliable. The number of good bits (EFL) is averaged (as described in detail below) to produce the Mean Error Free Length (MEFL) for all the APs on the list, which is one aspect of the present measure of communication "goodness". During scanning, the MU dedicates itself to acquiring as much data as possible about as many AP's as possible. Thus when the MU makes its initial registration (association) decision, it has EFL, MEFL and hence connection quality information on several APs.

The MEFL decreases as the MU moves away from an AP, and increases as a MU moves toward a new AP. Thus, it is possible for the MU to select among a group of APs based on finding the best (longest) MEFL. Thresholds based on MEFL have "hysteresis" applied to produce the effect of "stickiness" to the chosen AP. This reduces MU-AP registration thrashing and also avoids wasting time collecting MEFLs from other APs when the current connection is adequate.

Figure 2:
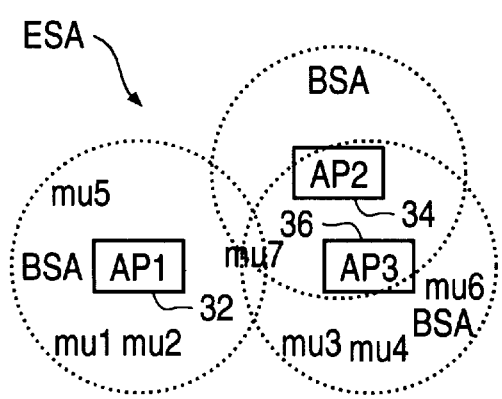
FIG. 2 shows in accordance with the present invention an extended service area including several access points and several mobile units.

MEFL is thereby the chief factor in roaming; there are other factors. An ESA may include several BSAs that have a substantial overlap in geographic coverage, as shown in FIG. 2. MU7 is in radio range of each of three APs 30, 32, 34, but chooses to associate with AP2 because the APs also transmit information in the Long Beacons that conveys their individual loading. MU7 uses the MEFL to determine that a radio connection works well enough to qualify any of the APs, but then periodically checks for the least loading to see which AP to associate with; this is referred to as "Static Load Balancing."

Static load balancing is possible because each MU registers (associates) with the AP it has chosen. The APs maintain lists of the MUs that they are serving, and the APs can communicate with each other over the backbone network to "hand off" service of a MU that has roamed from one AP to another. In this form of load balancing, the ever-changing loading of the APs is taken into consideration. The MUs (from time to time) check to see if they can roam to (associate with) another AP with usable MEFL, based on loading information. This is done with care, as it could lead to a situation in which a system could become unstable as a group of MUs change registration back and forth between two APs, or among a group of APs.

The present roaming technique thus has two phases. In the first phase the MUs gather data and in the second phase actions are taken based on this data. To accomplish the first phase, the MUs each maintain a list of all APs for which Long Beacons have been received and average the connection quality (EFL) data each hop time. The processing of this data leads to the qualification of a potential AP for registration.

The second phase is embodied in e.g. computer software (described in detail below) that functions as a finite state machine in each MU. The state diagram for this phase is shown in FIG. 3.

The state machine starts in the Full Scan state as shown. When enough time has elapsed to give a number of APs a chance to transmit a Long Beacon to the MU, and at least one AP has been found by the MU, an AP is chosen for a registration attempt by that MU. The Attempting Registration state is maintained while the MU sends out a Register First message and attempts to get a Register Acknowledge message in return. If none is received, and more than one AP is in the list, an attempt to register with another AP will occur (i.e. Attempting Registration is reentered with a new target AP). If the list is exhausted with no Register Acknowledge, the MU returns to the Full Scan state.

Given that a Register Acknowledge is received, the MU enters the Have Best AP state. This is an assumed connection quality, because no actual quality measurement has been made. Once the MU is registered, test pattern EFL data to establish the value of the MEFL is collected. Based on threshold operations applied to this data, the MU will move among the Have Best AP, Have Good AP, and Have Poor AP states. At any point, a total loss of AP contact returns the MU to Full Scan.

Figure 3:
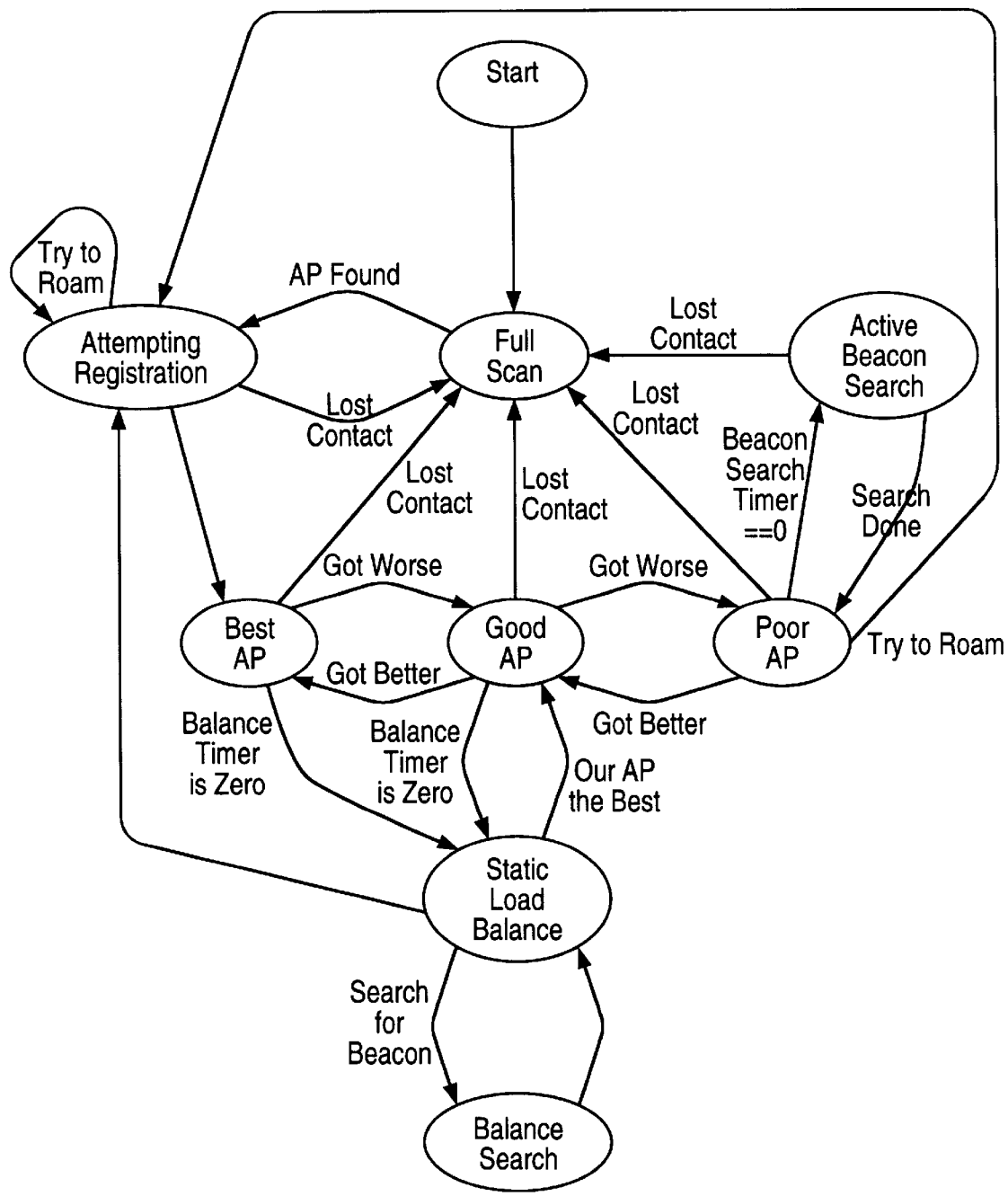
FIG. 3 is a state diagram showing roaming in accordance with the present invention.

When in the Poor State, as shown in FIG. 3, the MU will engage in an Active Beacon Search. This is to support a switch to another AP. The Active Beacon Search involves a scanning process similar to that described below in connection with static load balancing, except that the Active Beacon Search denotes a fixed (e.g. 20%) proportion of the frequency hops to scanning (listening), with the remainder being denoted to normal communications with the currently registered AP.

When in the Best or Good AP states and a static load balancing timer counts down to zero, the MU enters the Static Load Balance state. Here it cycles through the Balance Search state and actively tries to receive a new AP Long Beacon each cycle. The Balance Search state tries to receive a Long Beacon by changing hopping sequence and synchronization. If a better AP is found, the MU will attempt a new registration; if not, it returns to the Have Good AP state. The MU only searches the known APs.

If the MU is in Have Poor AP state, and other qualified APs with higher connection quality are in its AP list, the MU will try to roam by returning to the Attempting Registration state. If however, the MU has no good data on other APs, it spends time in the Active Beacon Search state where the hopping sequence and synchronization are changed temporarily so as to receive Long Beacons from other APs. This state cycles around every few hops in hopes of finding a better AP connection. However, in the case where there is no other AP to roam to, performance will drop when the Have Poor AP state is entered, due to time spent in active search.

To prevent excessive changing of registrations between an MU and APs, e.g. to prevent thrashing, hysteresis is included in the decision to change registration. Thus, in one example the AP goodness has a value in the range of 0 to 255, 0 being worst and 255 being highest connection quality. In this case the transition from Best State to Good State takes place at 187 and from Good State to Best State at 212. The transition from Good State to Poor State is at 155 and from Poor State to Good State at 187. This provides a direction-dependent offset, referred to herein as hysteresis.

Each AP periodically (for instance at each frequency hop) broadcasts either a Short Beacon or a Long Beacon. The Long Beacon is a combination of the Short Beacon and a test pattern. The Short Beacon includes the AP ID number, the hop tick number, the phase of the frequency hop, the current channel, an access point utilization value and an access point "hot head" count as well as other conventional housekeeping data. Typically, each hop is of 100 msec duration and each hop is divided into 256 ticks. The access point utilization value is an indication of the total bit rate being handled by that AP. Thus this is an aggregate of all of the communications with all MUs in contact with that particular AP. The "hot head" count is the number of individual MUs currently registered with that AP which have a data rate in excess of some threshold.

Thus these hot heads are the very active MUs. The utilization value arid hot head count is transmitted to provide load balancing as further described below; the goal is to balance the communications load over a number of APs.

The test pattern consists of a string of digital data, to measure the communications quality. Typically each test pattern is shorter than a standard data packet in order to conserve bandwidth. A number of test patterns may be used and typically they are somewhat hardware (radio circuitry) dependent. One exemplary test pattern (described below) becomes progressively more stressful in terms of the digits transmitted as one progresses through the test pattern. This is useful because the test patterns are used to measure an error free length. Other ways of providing more stressful test patterns include 1) transmitting the test patterns at reduced power; 2) transmitting longer test patterns, up to the maximum length of a data packet.

It is to be understood that in an alternative test pattern and comparison mechanism, the entire test pattern is received and a bit error rate is computed (e.g., mean bit error rate also referred to as MBER). However, this has been found to be problematic due to the loss of bit synchronization problem.

As described above in one embodiment, the error free length itself is not the sole measure of connection quality; instead the error free length is averaged over a number of received test patterns. A variety of averaging techniques may be used over a number of received test patterns (Long Beacons) as received by each mobile unit. It is to be understood that this calculation of MEFL is conducted by each MU for each AP from which it can receive Long Beacons. One MEFL calculation uses the following two stage adaptive filtering technique:

1. If one Long Beacon has been received, the EFL of that Long Beacon is the MEFL.
2. If two Long Beacons have been received, one adds the EFL of the second Long Beacon to that of the first and divides the sum by two.
3. If 3 to 7 Long Beacons have been received, one subtracts ¼ of the already-calculated MEFL and adds ¼ of the EFL of the latest received Long Beacon.
4. If the number of Long Beacons received is greater than 7 and less than 16, one subtracts ⅛th of the already calculated MEFL and adds ⅛th of the EFL from the latest received Long Beacon.
5. If the number of Long Beacons received is equal to or greater than 16, one subtracts 1/16th of the already calculated MEFL and adds 1/16th of the EFL from the latest received Long Beacon.

These steps 1–5 are the first stage of the adaptive filter. The results of steps 1 to 5 are stored for a number of entries, e.g. an array of 20. These entries are each called a "fractional average value." A moving average (mean) of e.g. the latest 20 fractional average values is computed to determine the current MEFL for a particular AP.

This particular digital filter is of course exemplary and not limiting.

Roaming in accordance with this invention is supported by intelligence located in each MU; the only portion of the roaming supported by the APs is that they periodically transmit the Long Beacons. Thus each MU determines when it should change its association (registration) with a particular AP. Roaming does not apply to so-called "ad hoc" networks which are networks involving only MUs and no APs. (These ad hoc networks are described in the above-referenced patent disclosure.)

Thus to facilitate roaming, each AP (actually the circuitry and associated software resident e.g. in the adapter card in each AP) transmits both Short Beacons and Long Beacons. The Short Beacons are transmitted e.g. every 7 ms and are not phase locked to the frequency hops. The Long Beacons are transmitted once per frequency hop, at the start of each frequency hop. A MU can tune to a particular frequency channel, listen e.g. for a period of 8 ms, and expect to receive a Short Beacon. The Long Beacons provide a means for the MUs to measure the effective error free length of their connection to each AP so as to select amongst AP for best communications link quality.

This is implemented by the state machine as described above with reference to FIG. 3. Each MU therefore maintains a linked list called the access point (AP) list, which includes data indicating the net address of a particular AP, when a Short Beacon was last received from that AP, that AP's relative phase position in the frequency hopping scheme, as well as values for recently received Short Beacons and Long Beacons, and the MEFL value. Thus the roaming intelligence in the MU ages the counts in the AP list and calculates the overall quality of the communications link to a current AP.

The calculation of the goodness (connection quality) between a MU and each AP with which it can communicate is as follows. The values used to calculate the access point goodness are the MEFL, the hot head count (for static load balancing as described below), and the access point utilization value as described above.

Figure 4:
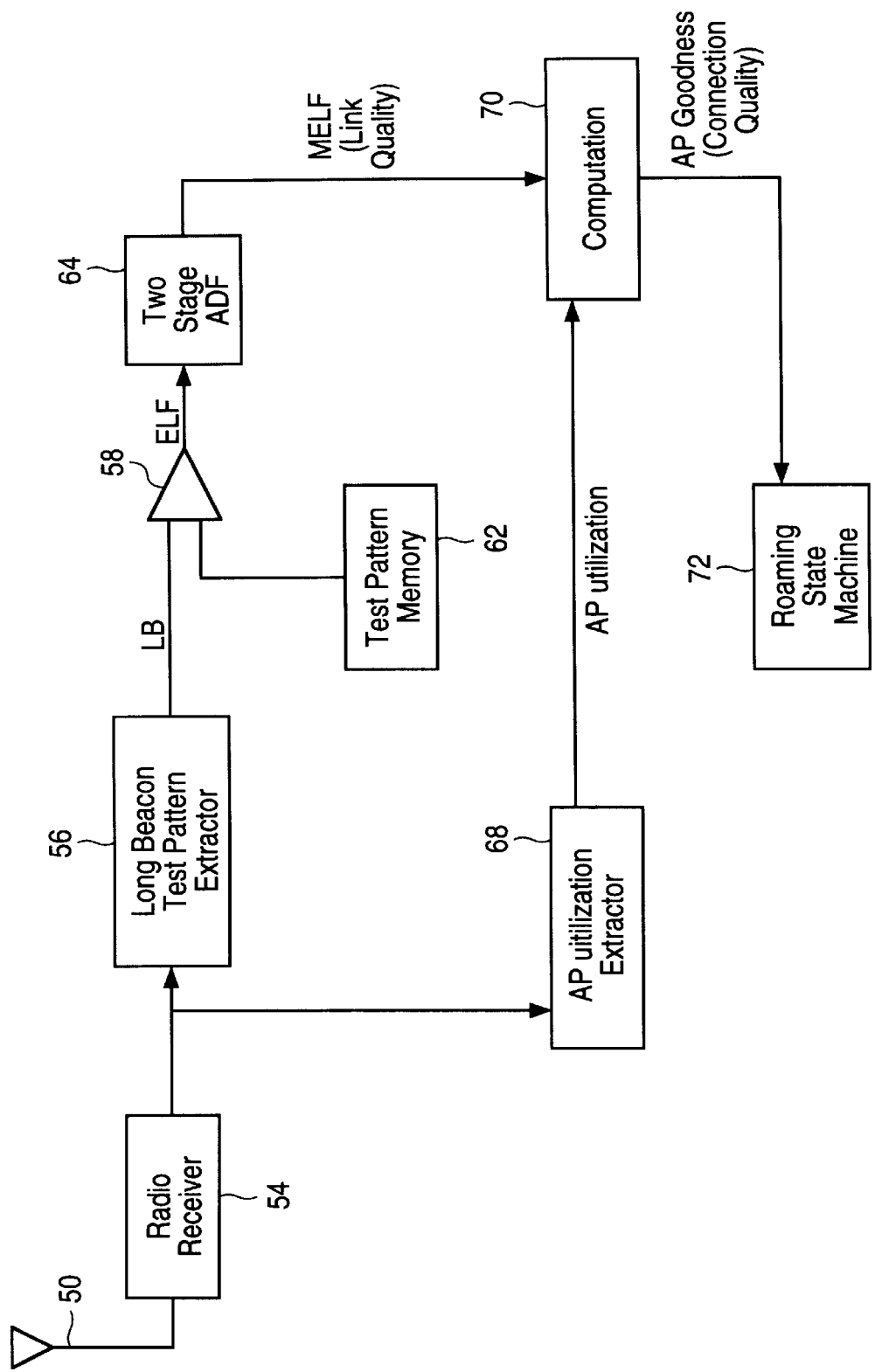
FIG. 4 shows structure of a mobile unit adapter card or a mobile unit.

FIG. 4 shows diagrammatically this process and the associated structure in an adapter card for an MU or as hardwired into an MU; this structure is located in each MU. Radio antenna 50 receives the Long Beacons and provides these to frequency-hopping radio receiver 54. Extractor 56 extracts the test pattern from the relevant field of the received Long Beacon. The AP utilization value is extracted from the received Long Beacon by extractor 68. Comparator 58 compares the test pattern in each received Long Beacon (LB) to the test pattern stored in the memory 62, to determine the EFL for that LB. The two stage adaptive filter (ADF) 64 computes, over a number of received Long Beacons, the current MEFL for each AP. The MEFL is also called the "link quality". Then an algebraic computation element 70 receives the MEFL and the AP utilization value for each AP and from these computes the AP goodness (connection quality). The AP utilization is a value of 0 to 255 indicating the utilization of that AP by all MUs. "Capacity" is equal to 255 minus the utilization. The AP goodness is then supplied to the Roaming State Machine 72, shown in FIG. 3.

The calculation of AP goodness can be done in several ways. One simple way is that connection quality equals (3*MEFL+Capacity)/4.

A more complex calculation of AP goodness uses conditional linear equations, the selection of which equation to use depending on whether the MEFL value is in a high, medium, or low range. (In general, for AP goodness the MEFL is more important than AP utilization). In this more complex calculation, for an MEFL value in the high range, AP goodness (as above) equals (3*MEFL+Capacity)/4. For an MEFL value in the medium range, AP goodness equals (3*MEFL+Capacity+128)/4. For an MEFL value in the low range, AP goodness equals (3*MEFL+Capacity)/8.

Static load balancing takes place even if current connection quality is satisfactory, in order to balance the load between various APs and hence improve service. Static load balancing uses the hot head count, as described above. In one version, static load balancing is accomplished by an MU in these steps:

1. Test to see (a) if the MU is in contact with more than one AP and (b) if the hot head count for the current AP exceeds two, and (c) if that current AP has a utilization exceeding 96 (out of 255).
2. If the test of step 1 is met, then search for a better AP (having lower utilization and hot head count) with which to associate. A short list of qualifying APs is generated; each qualifying AP has a hot head count and utilization less than that of the current AP. In one embodiment, utilization must be more than a particular value, e.g. 80 (of a maximum value of 255) lower than that of the current AP in order to qualify the AP under consideration.
3. Then, using the short list of qualifying APs, it is determined by a process described hereinafter which has the best (highest) AP goodness (connection quality), and the MU registration is shifted to that AP. This use of the connection quality, not just utilization, advantageously provides the result that over time as an AP becomes busier, the MUs that are farther away are more likely to migrate to another AP, which is what is intended.

The process for determining which AP on the short list has the highest AP goodness is called beacon searching and for static load balancing is as follows:

a. The MU has, stored in its AP list, the frequency hop phase of each AP on the AP list, as received in the Short Beacons. Thus the MU can predict at any time the transmission frequency of each AP on the AP list, based on its frequency hop phase.
b. The MU, knowing the current transmission frequency of each AP on its AP list, listens for a time period of several frequency hops to the first qualifying AP on the short list.

c. Then the MU reverts to a normal data communication mode (i.e., not searching actively) and communicates with the current registered AP.

This listening (scanning) is performed on a duty cycle basis, with the duty cycle depending on the current connection quality of that MU. If the current connection quality is Best, no scanning is done (0% duty cycle). If the current connection quality is Good, scanning is performed e.g. 5% of the time. If the current connection quality is Poor, scanning is performed e.g. 25% of the time. Thus static load balancing scanning (which undesirably reduces MU bandwidth) is done only when and to the extent needed.

d. This process of alternatively listening to the APs on the short list and reverting to the normal data communication mode is repeated until the MU has listened to each AP on the short list a number of times, and thus has received a number of Long Beacons from each AP on the short list.

e. Then the MU computes, as described above, the connection quality for each AP on the short list.

f. Finally, the registration is shifted to the AP on the short list with the highest connection quality.

Thereby the active beacon searching only consumes part (e.g. 20%) of the bandwidth of the MU, not impeding communications with the current (registered) AP.

This beacon searching process is supported by a separate process mentioned above called scanning. The purpose of scanning is to supply the information to keep current each MU's AP list. In scanning, the MU periodically tunes to the various hop frequencies and listens for a Short Beacon from any AP. This tuning is out of the hop sequence of the AP with which that MU is currently registered. Upon receipt of a Short Beacon, the MU enters the Short Beacon data in its AP list.

In one embodiment, roaming is supported by software (e.g. firmware) which is a set of computer programs partially located in each AP and partially located in each MU. This software is similar to that described in the above-referenced patent disclosure in terms of its overall operation, but provides different means for supporting roaming. Notably therefore in one embodiment, no hardware modifications are required to that of the above-referenced patent disclosure to support the present roaming approach, but only changes in the roaming software are required.

One version of software to support roaming as described above is shown in the Microfiche Appendix which is a portion of this disclosure and which is written in assembly language. This computer program (code) is commentated for understanding. It is to be appreciated that this code is only for roaming and that other portions of the system are similar to that described in the above-referenced patent disclosure and hence not shown herein.

The first software module shown in the Microfiche Appendix is the file entitled TXISR.ASM which is a software present in the AP to provide the Long Beacons. The code for this is on page 4 of this file TXISR.ASM (page numbers of each file are at the top of the Microfiche frame; the page numbers at the bottom of each Microfiche frame are that of the entire Microfiche Appendix). The fields which define the Long Beacon (here called "beacon") are in the middle of page 4. This actually shows the Short Beacon portion of the Long Beacon; as explained above the remainder of the Long Beacon is the test pattern. Three different exemplary test patterns are shown at the bottom of page 4 extending over to page 5 of this file. The test pattern in the middle of page 5 of this module is one having increasing difficulty, with an exponential rate of increase. Note that the commentated (those beginning with ";;") lines of code do not execute.

The next file in the Microfiche Appendix is entitled macrxt2.asm, which is software present in each MU. This file shows the process to calculate the EFL and MEFL. The calculation of the EFL is shown at the top of page 6 of this file and the calculation of the MEFL, using a process described above using the two stage adaptive digital filter, is at the lower portion of page 6 through page 8, with the second stage at page 8.

The third file in the Microfiche Appendix is entitled roaming.asm and is the software in each MU to support roaming generally. The state machine thresholds are shown in the upper half of page 7 of this file.

The timers which are used in the above-described state machine are shown at the bottom of page 7 carrying over to page 8 of this file.

The initialization of the state machine begins on page 10 of this file, carrying over to the top of page 11. Beginning on page 11 of this file is the main loop of the roaming control code which corresponds to the state diagram of FIG. 3. This carries over to page 16 of this file, at which point the static load balancing process beings, as described above. The state machine code continues through page 36.

At the lower portion of page 36, the code is shown for calculation of the AP goodness, i.e. the connection quality. This carries over through page 40 of this file. Note that in this code three alternative AP goodness calculations are provided; these are exemplary.

Other features may be present in various embodiments of the present invention. For instance, the Long Beacons can be transmitted such that they indicate the quality of the link. This involves transmitting the Long Beacons at lower power, to stress the link, or reducing the Long Beacon transmission power progressively during each Long Beacon. Another feature is an AP fully loaded indicator; upon receipt of this indicator, any MU not registered with that AP treats that AP as being invisible, i.e. not available.

This disclosure is illustrative and not limiting; further modifications will be apparent to one skilled in the art and are intended to fall within the scope of the appended claims.

What is claimed:

1. A method for communicating between a mobile unit and a plurality of access points, the access points being in communication with one another on a network, the mobile unit communicating by radio with the access points, the method comprising:

transmitting a message of data known to the mobile unit periodically and at times known to the mobile unit on a first access point to the mobile unit;

evaluating at the mobile unit a quality of communications by measuring how much of the known data is received at the mobile unit; and if the quality falls below a first threshold value, switching to a second access point for subsequent communications with the mobile unit, wherein the times are known in advance by the unit such that the evaluating occurs even when the unit does not receive the message.

2. The method of claim 1, wherein the message includes a test pattern.

3. The method of claim 2, wherein the communications are by digital data packets, and the test pattern includes fewer digits than does a maximum-length packet.

4. The method of claim 2, wherein the communications are by digital data packets, and the test pattern includes the same number of digits as does a maximum-length packet.

5. The method of claim 1, wherein the transmitting includes transmitting by radio frequency hopping.

6. The method of claim 5, wherein the transmitting includes transmitting at least an identification of the first access point, a current phase of the frequency hopping, and the message of data is a test pattern.

7. The method of claim 1, wherein each mobile unit is a computing device.

8. The method of claim 1, wherein the transmitting includes broadcasting the message to a plurality of mobile units, and repeating the broadcast at intervals.

9. The method of claim 1, wherein the switching includes:
determining if a quality of communication with the second access point exceeds a second threshold value, the second threshold value being higher than the first threshold value; and
switching only if the quality of communication with the second access point exceeds the second threshold value.

10. The method of claim 1, wherein the communication is by frequency hopping radio, and further comprising repeating the transmitting and evaluating of claim 2 at a plurality of frequency hops.

11. The method of claim 1, wherein the transmitting also transmits an indicator of whether the first access point is fully loaded and unavailable.

12. The method of claim 11, wherein the mobile unit will not attempt to register with the first access point if the mobile unit receives indication that the first access point is unavailable.

13. A method for communicating between a mobile unit and a plurality of access points, the access points being in communication with one another on a network, the mobile unit communicating by radio with the access points, the method comprising:
transmitting a message of data known to the mobile unit on a first access point to the mobile unit, wherein the message includes a test pattern, the test pattern comprising a string of numbers which is progressively more likely to induce errors upon receipt at the mobile unit;
evaluating at the mobile unit a quality of communications by measuring how much of the known data is received at the mobile unit; and
if the quality falls below a first threshold value, switching to a second access point for subsequent communications with the mobile unit.

14. The method of claim 13, wherein the message of data known to the mobile unit is included in a transmitted data packet, and wherein the test pattern is shorter than the transmitted data packet.

15. The method of claim 13, wherein the test pattern is transmitted at progressively lower power levels.

16. A method for communicating between a mobile unit and a plurality of access points, the access points being in communication with one another on a network, the mobile unit communicating by radio with the access points, the method comprising:
transmitting a message of data known to the mobile unit on a first access point to the mobile unit;
evaluating at the mobile unit a quality of communications by measuring how much of the known data is received at the mobile unit, wherein the evaluating comprises determining an error free length of the received data; and
if the quality falls below a first threshold value, switching to a second access point for subsequent communications with the mobile unit.

17. The method of claim 16, wherein the determining includes taking a mean of the error free length.

18. The method of claim 17, wherein the taking of a mean includes applying an adaptive digital filter to the error free length.

19. The method of claim 18, wherein the applying includes taking a rolling average of a plurality of error free lengths.

20. A method for communicating between a mobile unit and a plurality of access points, the access points being in communication with one another on a network, the mobile unit communicating by radio with the access points, the method comprising:
transmitting a message of data known to the mobile unit on a first access point to the mobile unit, wherein the message includes a test pattern, the test pattern being transmitted at a lower power level than are other transmissions of data;
evaluating at the mobile unit a quality of communications by measuring how much of the known data is received at the mobile unit; and
if the quality falls below a first threshold value, switching to a second access point for subsequent communications with the mobile unit.

21. A method for communicating between a mobile unit and a plurality of access points, the access points being in communication with one another on a network, the mobile unit communicating by radio with the access points, the method comprising:
transmitting a message of data known to the mobile unit on a first access point to the mobile unit, wherein the transmitting includes transmitting by radio frequency hopping, transmitting at least an identification of the first access point, a current phase of the frequency hopping, and transmitting the number of other mobile units in communication with the first access point, each of which are communicating at a data rate exceeding a threshold, and wherein the message of data is a test pattern;
evaluating at the mobile unit a quality of communications by measuring how much of the known data is received at the mobile unit; and
if the quality falls below a first threshold value, switching to a second access point for subsequent communications with the mobile unit.

22. A method for communicating between a mobile unit and a plurality of access points, the access points being in communication with one another on a network, the mobile unit communicating by radio with the access points, the method comprising:
transmitting a message of data known to the mobile unit on a first access point to the mobile unit;
evaluating at the mobile unit a quality of communications by measuring how much of the known data is received at the mobile unit; and
if the quality falls below a first threshold value, switching to a second access point for subsequent communications with the mobile unit, wherein at least a second mobile unit is in communication with the second access point, and wherein the evaluating includes determining a utilization of the second access point by the second mobile unit.

23. A method for communicating between a mobile unit and a plurality of access points, the access points being in communication with one another on a network, the mobile unit communicating by radio with the access points, the method comprising:
transmitting a message of data known to the mobile unit on a first access point to the mobile unit;
evaluating at the mobile unit a quality of communications by measuring how much of the known data is received at the mobile unit; and if the quality falls below a first threshold value, switching to a second access point for subsequent communications with the mobile unit, wherein even if the quality is above the first threshold value, switching to the second access point to balance a utilization of the first and second access points.

24. A method for communicating between a mobile unit and a plurality of access points, the access points being in communication with one another on a network, the mobile unit communicating by radio with the access points, the method comprising:

transmitting a message of data known to the mobile unit on a first access point to the mobile unit;

evaluating at the mobile unit a quality of communications by measuring how much of the known data is received at the mobile unit, wherein the evaluating includes:

measuring a total data rate at each of the first and second access points from all mobile units in communication with each of the first and second access points; and counting a number of individual mobile units in communication with each of the first and second access points at a data rate exceeding a third threshold value; and if the quality falls below a first threshold value, switching to a second access point for subsequent communications with the mobile unit.

25. A method for communicating between a mobile unit and a plurality of access points, the access points being in communication with one another on a network, the mobile unit communicating by radio with the access points, the method comprising:

transmitting a message of data known to the mobile unit on a first access point to the mobile unit;

evaluating at the mobile unit a quality of communications by measuring how much of the known data is received at the mobile unit;

if the quality falls below a first threshold value, switching to a second access point for subsequent communications with the mobile unit; and measuring a total data rate at each of the first and second access points from all mobile units in communication with each of the first and second access points.

26. A method for communicating between a mobile unit and a plurality of access points, the access points being in communication with one another on a network, the mobile unit communicating by radio with the access points, the method comprising:

transmitting a message of data known to the mobile unit on a first access point to the mobile unit, wherein the transmitting includes transmitting by radio frequency hopping;

evaluating at the mobile unit a quality of communications by measuring how much of the known data is received at the mobile unit; and if the quality falls below a first threshold value, switching to a second access point for subsequent communications with the mobile unit, wherein the switching comprises:

determining the quality of the communications;

scanning a plurality of radio frequencies for transmissions from a number of access points; and storing in the mobile unit a phase of the frequency hopping of each of the number of access points; and varying a proportion of time spent in the scanning, dependent on the determined current quality of the communications.

27. The method of claim 26, further comprising:

referring to the stored phase of a selected access point;

determining from the stored phase a current transmission frequency of the selected access point; and tuning the mobile unit to receive at the current frequency of the selected access points.

28. An access point for use in a wireless local area network having a plurality of mobile units communicating with the access point, the access point including:

a radio transmitter; and a message generator operatively connected to the radio transmitter, wherein the message generator generates a test pattern to be transmitted by the transmitter to the mobile units, wherein the test pattern includes a string of numbers which is progressively more likely to induce errors upon receipt at the mobile units.

29. The access point of claim 28, wherein the message generator also generates a utilization value by all mobile units of the access point, for transmission by the transmitter.

30. The access point of claim 28, wherein the test pattern is shorter than a data packet transmitted to the mobile units.

31. The access point of claim 28, wherein the test pattern is transmitted at progressively lower power levels.

32. An adapter unit for installation in an access point in a wireless communication system having a plurality of connected access points and a plurality of mobile units communicating with the access point, the adapter unit including:

a radio transmitter; and a message generator operatively connected to the radio transmitter, wherein the message generator generates a test pattern to be transmitted by the transmitter to the mobile units, wherein the test pattern includes a string of numbers which is progressively more likely to induce errors upon receipt at the mobile units.

33. The adapter unit of claim 32, wherein the test pattern is shorter than a data packet transmitted to the mobile units.

34. A mobile unit for being part of a wireless local area network having a plurality of access points, the mobile unit comprising:

a radio receiver for receiving transmissions from the access points;

a memory holding a stored data pattern; and a comparator having a first input terminal connected to the radio receiver and a second input terminal connected to the memory, for comparing the stored data pattern to a data pattern in a received radio transmission periodically and at times known to the mobile unit, thereby providing at an output terminal of the comparator an indication of a quality of communications between each access point and the mobile unit, wherein the times are known in advance by the unit such that the comparing occurs even when the unit does not receive the message.

35. The mobile unit of claim 34, further comprising means for switching an association of the mobile unit from a first access point to a second access point if the quality of communications with the first access point falls below a first threshold value.

36. The mobile unit of claim 35, wherein the means for switching includes:

means for determining if a quality of communication with the second access point exceeds a second threshold value, the second threshold value being higher than the first threshold value; and means for switching only if the quality of communication with the second access point exceeds the second threshold value.

37. The mobile unit of claim 35 wherein the transmissions are by frequency hopping, and further comprising means for repeating the switching at each frequency hop.

38. The mobile unit of claim 34, wherein the transmissions are of digital data packets, and the data pattern includes fewer digits than does a data packet.

39. The mobile unit of claim 34, wherein the radio receiver is a frequency hopping receiver.

40. The mobile unit of claim 34, wherein the mobile unit is an adapter unit including terminals for connection to a computing device.

41. The mobile unit of claim 34, wherein the mobile unit further includes a computing device connected to the radio receiver.

42. A mobile unit for being part of a wireless local area network having a plurality of access points, the mobile unit comprising:

a radio receiver for receiving transmissions from the access points;

a memory holding a stored data pattern; and a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit, wherein the stored data pattern is a string of numbers which is progressively more likely to induce errors upon receipt at the mobile unit.

43. The mobile unit of claim 42, wherein the test pattern is shorter than a data packet transmitted to the mobile unit.

44. A mobile unit for being part of a wireless local area network having a plurality of access points, the mobile unit comprising:

a radio receiver for receiving transmissions from the access points;

a memory holding a stored data pattern; and a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit, wherein the comparator determines an error free length of the received data pattern.

45. The mobile unit of claim 44, further comprising a filter operatively connected to the comparator for taking a mean of a plurality of error free lengths.

46. The mobile unit of claim 44, further comprising an adaptive digital filter connected to an output of the comparator for taking a mean of the error free length.

47. The mobile unit of claim 46, wherein the adaptive filter takes a rolling average of a plurality of error free lengths.

48. A mobile unit for being part of a wireless local area network having a plurality of access points, the mobile unit comprising:

a radio receiver for receiving transmissions from the access points;

a memory holding a stored data pattern;

a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit;

means for switching an association of the mobile unit from a first access point to a second access point if the quality of communications with the first access point falls below a first threshold value, wherein at least one other mobile unit is in communication with the second access point, and wherein the means for switching includes means for determining a utilization of the second access point by the at least one other mobile unit.

49. A mobile unit for being part of a wireless local area network having a plurality of access points, the mobile unit comprising:

a radio receiver for receiving transmissions from the access points;

a memory holding a stored data pattern;

a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit;

means for switching an association of the mobile unit from a first access point to a second access point if the quality of communications with the first access point falls below a first threshold value; and second means for switching the association to the second access point to balance a utilization of the first and second access points.

50. The mobile unit of claim 49, wherein the second means for switching includes:

means for measuring a total data rate at each of the first and second access points for all mobile units in communication with each of the first and second access points; and means for counting a number of individual mobile units in communication with each of the first and second access points at a data rate exceeding a third threshold value.

51. A mobile unit for being part of a wireless local area network having a plurality of access points, the mobile unit comprising:

a radio receiver for receiving transmissions from the access points;

a memory holding a stored data pattern;

a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit;

means for switching an association of the mobile unit from a first access point to a second access point if the quality of communications with the first access point falls below a first threshold value; and means for measuring a total data rate at each of the first and second access points for all mobile units in communication with each of the first and second access points.

52. A mobile unit for being part of a wireless local area network having a plurality of access points, the mobile unit comprising:

a frequency hopping radio receiver for receiving transmissions from the access points;

a memory holding a stored data pattern;

a comparator having a first input terminal connected to the radio receiver and a second input terminal connected to the memory, for comparing the stored data pattern to a data pattern in a received radio transmission, thereby providing at an output terminal of the comparator an indication of a quality of communications between each access point and the mobile unit;

means for scanning a plurality of radio frequencies for transmissions from a number of access points;

a memory for storing a phase of the frequency hopping of each of the number of access points; and means for varying a proportion of time spent in scanning, the proportion being dependent on the current quality of the communications.

53. The mobile unit of claim 52, further comprising:

means for determining from the stored phase a current transmission frequency of a selected access point; and means for tuning the mobile unit to receive at the current frequency of the selected access point.

54. An access point for use in a wireless local area network having a plurality of mobile units communicating with the access point, the access pint including:

a radio transmitter; and a message generator operatively connected to the radio transmitter, wherein the message generator venerates a test pattern to be transmitted by the transmitter to the mobile units periodically and at times known to the mobile units, wherein the message generator also generates an indicator of whether the access point is fully loaded and unavailable.

55. The access point of claim 54, wherein the mobile units will not attempt to register with the access point if the mobile units receive indication that the access point is unavailable.

56. A method for communicating between a unit and a base using a plurality of communication channels, comprising:

transmitting a message of data known to the unit on a first communication channel periodically and at times known to the unit from the base to the unit;

evaluating at the unit a quality of communications on the first channel by measuring how much of the known data is received at the mobile unit; and if the quality falls below a threshold, switching to a second channel for subsequent communications between the unit and the base, wherein the times are known in advance by the unit such that the evaluating occurs even when the unit does not receive the message.

57. A method for communicating between a unit and a base using a plurality of communication channels, comprising:

transmitting a message of data known to the unit on a first communication channel periodically and at times known to the unit from the base to the unit;

evaluating at the unit a quality of communications on the first channel by measuring how much of the known data is received at the mobile unit; and if the quality falls below a threshold, switching to a second channel for subsequent communications between the unit and the base, wherein the evaluating occurs at the times known to the unit, even when the unit does not receive the message.

58. A method for communicating between a mobile unit and a plurality of access points, the access points being in communication with one another on a network, the mobile unit communicating by radio with the access points, the method comprising:

transmitting a message of data known to the mobile unit periodically and at times known to the mobile unit on a first access point to the mobile unit;

evaluating at the mobile unit a quality of communications by measuring how much of the known data is received at the mobile unit; and if the quality falls below a first threshold value, switching to a second access point for subsequent communications with the mobile unit, wherein the evaluating occurs at the times known to the unit, even when the unit does not receive the message.

59. A mobile unit for being part of a wireless local area network having a plurality of access points, the mobile unit comprising:

a radio receiver for receiving transmissions from the access points;

a memory holding a stored data pattern; and a comparator having a first input terminal connected to the radio receiver and a second input terminal connected to the memory, for comparing the stored data pattern to a data pattern in a received radio transmission periodically and at times known to the mobile unit, thereby providing at an output terminal of the comparator an indication of a quality of communications between each access point and the mobile unit, wherein the comparing occurs at the times known to the unit, even when the unit does not receive the message.

\* \* \* \* \*